United States Patent
Payer

(10) Patent No.: US 9,456,592 B1
(45) Date of Patent: Oct. 4, 2016

(54) SNAG-RESISTANT FISHING LURE

(71) Applicant: Frank S. Payer, Steelton, PA (US)

(72) Inventor: Frank S. Payer, Steelton, PA (US)

(*) Notice: Subject to any disclaimer, the term of this patent is extended or adjusted under 35 U.S.C. 154(b) by 253 days.

(21) Appl. No.: 14/198,665

(22) Filed: Mar. 6, 2014

Related U.S. Application Data

(60) Provisional application No. 61/779,135, filed on Mar. 13, 2013.

(51) Int. Cl.
*A01K 85/02* (2006.01)
*A01K 85/00* (2006.01)

(52) U.S. Cl.
CPC ............. *A01K 85/02* (2013.01); *A01K 85/00* (2013.01)

(58) Field of Classification Search
CPC .............................. A01K 85/00; A01K 91/04
USPC ........... 43/42.02, 42.04, 42.05, 42.19, 42.36, 43/42.4, 42.41, 42.45, 42.49, 44.83, 44.87, 43/44.9, 44.91
See application file for complete search history.

(56) References Cited

U.S. PATENT DOCUMENTS

| | | | | | |
|---|---|---|---|---|---|
| 1,627,512 A | * | 5/1927 | Guhes | ................... | A01K 85/16 43/26.2 |
| 2,819,553 A | * | 1/1958 | Fultz | ..................... | A01K 85/16 43/42.12 |
| 3,210,883 A | * | 10/1965 | Ulsh | ...................... | A01K 91/04 24/662 |
| 3,253,363 A | * | 5/1966 | Steehn | .................. | A01K 85/00 43/42.13 |
| 6,813,857 B2 | | 11/2004 | Payer | | |

* cited by examiner

*Primary Examiner* — Darren W Ark
*Assistant Examiner* — Danielle Clerkley
(74) *Attorney, Agent, or Firm* — Hooker & Habib, P.C.

(57) ABSTRACT

A combination jig and snag guard includes a jig having a jig body having a back and opposite sides and a fishhook extending away from the back of the jig body, the snag guard assembly having a pair of guard filaments, the guard filaments extending from opposite sides of the jig body to a connector configured to be tied to a fishing line, each guard filament having an end adjacent the respective side of the jig body, the jig body having limited or no free rotation with respect to the snag guard assembly about an axis of rotation defined by the ends of the guard filaments.

26 Claims, 4 Drawing Sheets

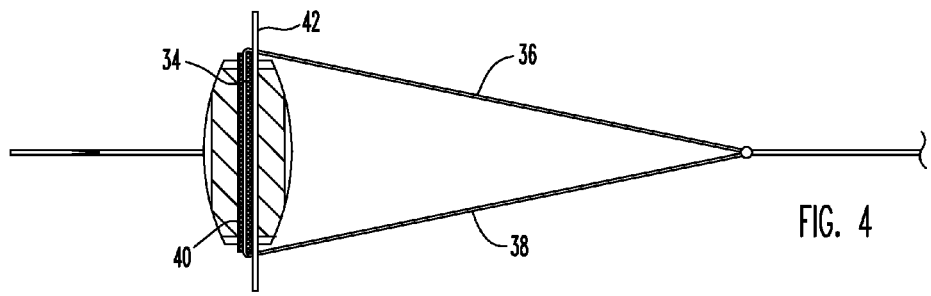
FIG. 4
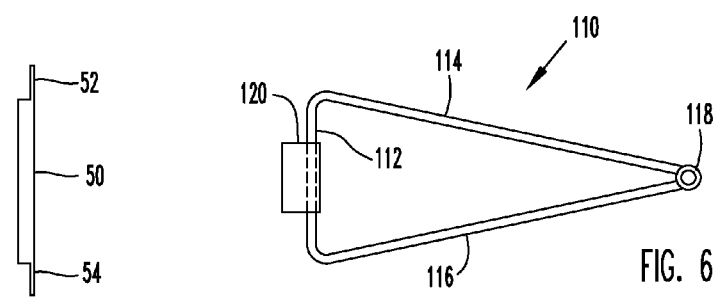
FIG. 5
FIG. 6
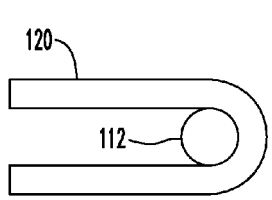
FIG. 7
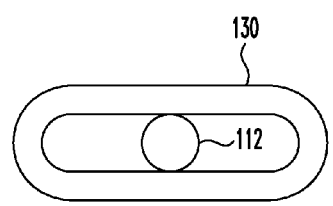
FIG. 9

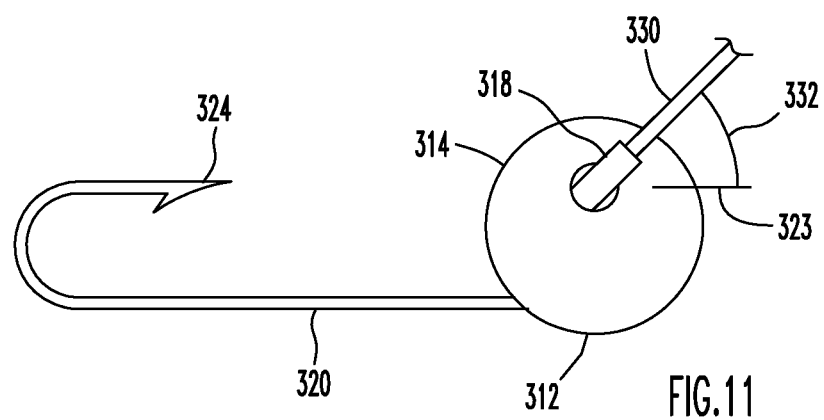
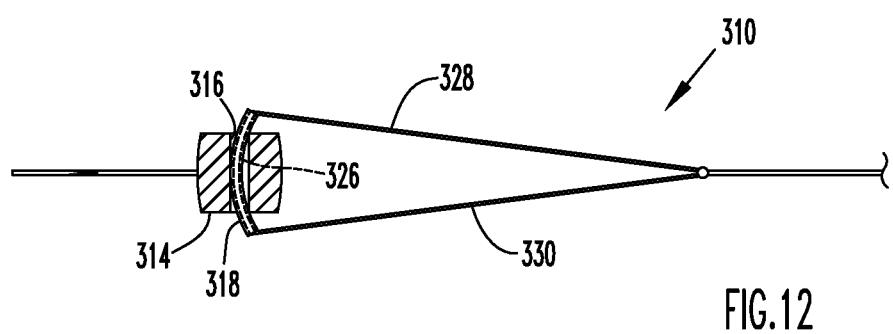

SNAG-RESISTANT FISHING LURE

FIELD OF THE DISCLOSURE

The disclosure relates generally to fishing lures, and particularly to a snag-resistant fishing lure.

BACKGROUND OF THE DISCLOSURE

Fishing is a popular recreational pastime. One favorite style of fishing involves casting a fishing lure and retrieving the lure to catch fish. The retrieve entices fish to strike the lure. Lures are available in almost an infinite variety of shapes, weights, and buoyancy.

A lure must be cast near fish to be effective. When fishing in open waters, lures can be retrieved without snagging. Many game fish, though, avoid open water and congregate or school close to underwater structure. Such structure may include tree stumps, vegetation, rocks, or other objects. Casting the lure among these objects is often the key to successfully catching fish.

Lures often snag when retrieved through structure. The lure body or a fishhook carried by the lure snags against the structure. The lure can't be retrieved until the snag is cleared. The fishing line often must be cut to continue fishing, and the lure is lost.

Snag-resistant fishing lures have been developed that resist snagging of the lure during the retrieve. Embodiments of snag-resistant fishing lures are disclosed in my U.S. Pat. No. 6,813,857 incorporated by reference as if fully set forth herein, which discloses a triangular snag guard. One of the disclosed lures is a jig (a jig includes a lead sinker forming the head or body of the lure, with a hook molded into the head or body). The triangular snag guard is preferably formed from the fishing line is attached to the jig, the snag guard having a first line segment that passes through the jig head and a pair of second line segments defining guard filaments that extend away from opposite sides of the jig to a knot formed in the fishing line.

The jig head can rotate about the first line segment, with the weight of the jig head biasing the fishhook to ride in an upright position during retrieve. The snag guard is taut during the retrieve; the guard filaments extend in front of the jig head and engage obstructions to enable the jig head and hook to move past the obstruction without snagging.

The snag-resistant jig described above has been successful in reducing snagging as compared to jigs without a triangular snag guard. It has been found, however, that despite the weight of the jig head biasing the fishhook to ride upright, that on occasion the fishhook will face downwardly during the retrieve. When the fishhook is not riding upright the risk of snagging is increased, thereby negating to some degree the benefits of the snag guard.

When the jig is being cast, the jig head pulls the snag guard behind it, keeping the snag guard taut. It is theorized that when the jig hits the water after a cast, the snag guard relaxes and can then rotate about the jig head to a point that will cause the fishhook to face downwardly during retrieve.

Thus there is a need for an improved jig that further resists a downward facing fishhook during retrieve but can be used with my triangular snag guard assembly

SUMMARY OF THE DISCLOSURE

Disclosed is an improved snag guard assembly that can be used with jigs that further resists a downward facing fishhook during retrieve of the jig.

The snag guard assembly disclosed in my '857 patent includes a pair of guard filaments that extend forward from opposite sides of the jig head during retrieval of the jig head. The guard filaments help resist snagging during the retrieve. The snag guard assembly also permits the jig to freely rotate relative to the snag guard assembly essentially 360 degrees around the snag guard assembly.

In experimenting with jigs employing the snag guard assembly disclosed in my '857 patent, I discovered that limiting or eliminating the free range of rotation of the jig relative to the snag guard assembly further improved the chances that the fishhook remained upright during the retrieve while still providing adequate snag resistance.

An embodiment of a combination jig and snag guard assembly in accordance with the present disclosure includes a jig having a jig body having a back and opposite sides and a fishhook extending away from the back of the jig body, the snag guard assembly having a pair of guard filaments, the guard filaments extending from opposite sides of the jig body to a connector configured to be tied to a fishing line, each guard filament having an end adjacent the respective side of the jig body, the jig body having limited or no free rotation with respect to the snag guard assembly about an axis of rotation defined by the ends of the guard filaments.

In some preferred embodiments, the jig can rotate relative to the snag guard assembly from a first position in which the one side of the fishhook is adjacent the snag guard to a second position about 180 degrees or so from the first position. The snag guard extends away from the jig essentially parallel with the shank of the fishhook when in the second position.

In another embodiment, the jig can rotate from a first position in which the snag guard is angularly spaced away from the one side of the fishhook to a second position about 90 degrees or so from the first position.

In the preferred embodiments described above, the one side of the fishhook is the side facing the barb of the fishhook.

The snag guard assembly can include different types of structure to limit relative rotation of the jig with respect to the guard assembly. In one possible embodiment, a filament or wire (preferably stiff monofilament fishing line) located in a through-hole extending through the jig extends outwardly away from both sides of the jig. The filament obstructs rotation of the jig with respect to the snag guard assembly when the jig reaches its second position.

In a second preferred embodiment, the snag guard assembly includes a stop member located in the through-hole extending through the jig. The stop member and the through-hole cross-section are configured to cooperatively limit the range of relative motion between the jig and the snag guard assembly. The desired shape of the through-hole cross-section can be formed when the jig head is manufactured.

In a third preferred embodiment, the snag guard assembly includes a filler piece that is placed in a jig head with a preexisting hole configuration (such as a circular hole). The filler piece modifies the effective cross-section of the hole to enable the stop member and jig to cooperatively limit the range of relative rotation between the jig and the snag guard assembly.

In a fourth preferred embodiment, the snag guard assembly is biased to extend from the jig head at a fixed angle offset from the shank of the fishhook. When the snag guard relaxes when the jig hits the water, the bias resists relative rotation of the snag guard with respect to the jig head. The flexibility of the guard filaments enables the guard filaments to flex during retrieve, allowing the jig and the fishhook to be properly oriented during the retrieve.

The disclosed fishing lure includes an improved snag guard assembly that further increases resistance to snagging and the change to catch more fish on more retrieves.

Other objects and features of the disclosure will become apparent as the description proceeds, especially when taken in conjunction with the accompanying drawing sheets illustrating one or more illustrative, non-limiting embodiments.

BRIEF SUMMARY OF THE DRAWINGS

FIG. 4 is a sectional view taken generally along line 4-4 of FIG. 1;

FIG. 5 is a top view of an alternative sleeve that can be used to replace the sleeve and filament members in the snag guard assembly shown in FIGS. 1-4;

FIG. 6 is a top view of a portion of a second embodiment snag guard assembly;

FIG. 7 is a side view of the stop member shown in FIG. 6 forming part of the second embodiment snag guard assembly;

FIG. 9 is a side view of an alternative stop member that can be used in the snag guard assembly shown in FIG. 6;

FIG. 11 is a side view of a jig and a fourth embodiment snag guard assembly; and FIG. 12 is a partial horizontal sectional view of the jig and snag guard assembly shown in FIG. 11.

DETAILED DESCRIPTION

Figure 1:
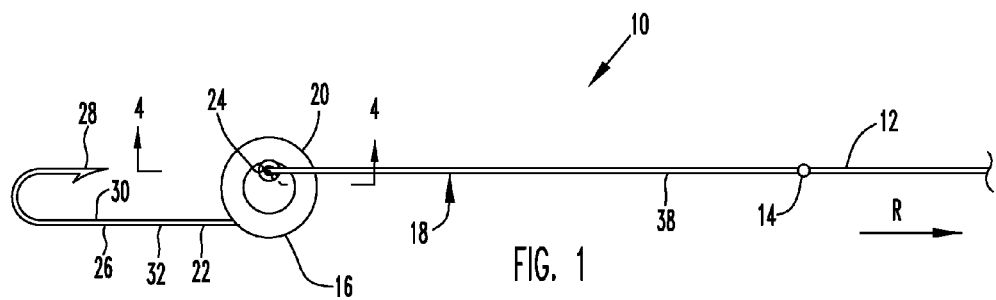
FIG. 1 is a side view of a jig and first embodiment snag guard assembly.

FIGS. 1-4 illustrate a fishing lure assembly 10 having a first embodiment snag guard assembly. The fishing lure assembly is shown being pulled by a fishing line 12 in a retrieval direction R. The fishing line 12 is tied to a metal connector or ring 14 that connects the fishing line to the fishing lure assembly.

In yet other possible embodiments the connector 14 can be a knot tied in the fishing line 12 attaching the lure assembly 10 to the line 12, or some other conventional attachment or connection structure known in the fishing lure art for attaching a lure to a fishing line.

The fishing line 12 is nylon monofilament line. Fishing lines made of other types of material and suitable for casting and retrieval of the fishing lure assembly 10 are known and can be used in different embodiments of the fishing lure assembly 10.

The fishing lure assembly 10 includes a jig 16 and a first embodiment snag guard assembly 18 attached to the jig 16. The jig 16 has a jig head 20 molded from lead or other suitable relatively heavy material and a fishhook 22 rigidly held by the jig head 20. The illustrated jig head 20 is shaped like a conventional football-type jig. A through-hole or through-bore extends through the jig head 20 to attach the snag guard assembly 18 to the jig 16.

When fished, the jig 16 may be dressed, that is, the jig 16 may include plastic bait, streamers, natural baits, or other conventional jig dressing that cover or extend along the hook 22.

The fishhook 22 has a shank 26 extending away from the jig head 20 to a barb 28 spaced to one side of the shank 26. The shank 26 includes an upper surface 30 on the one side facing the barb 28 and an opposite lower surface 32 facing away from the barb 28.

The snag guard assembly includes the connector 14, an attachment member 34 that extends through the jig bore 24 and defines an axis of relative rotation of the jig 16 about the attachment member 34, a first guard filament 36, and a second guard filament 38, the guard filaments 36, 38 attached to the connector 14. The attachment member 34 and the guard filaments 36, 38 are formed from a single length of fishing line, but may be wire and do not necessarily have to the be same material or diameter of the line 12. These elements of the snag guard assembly 18 are identical to the snag guard assembly disclosed in my '857 patent and so will not be described in further detail.

The snag guard assembly 18 further includes a tubular sleeve extending through the jig bore 24 and an anti-rotation filament 42 also extending through the jig bore 24. The attachment member 34 is received in the sleeve 40 and is free to rotate within the sleeve 40. The sleeve 40 is closely received in the jig bore 24 and is retained by friction within the bore 24. The friction also prevents relative rotation between the sleeve 40 and the jig 16. If desired, the sleeve 40 can be glued or otherwise fixedly attached to the jig 16.

The anti-rotation filament 42 is closely received between the sleeve 40 and the wall of the jig bore 24 and is retained by friction in the bore 24. The friction also resists relative movement or displacement between the filament 42 and the jig 16.

Figure 3:
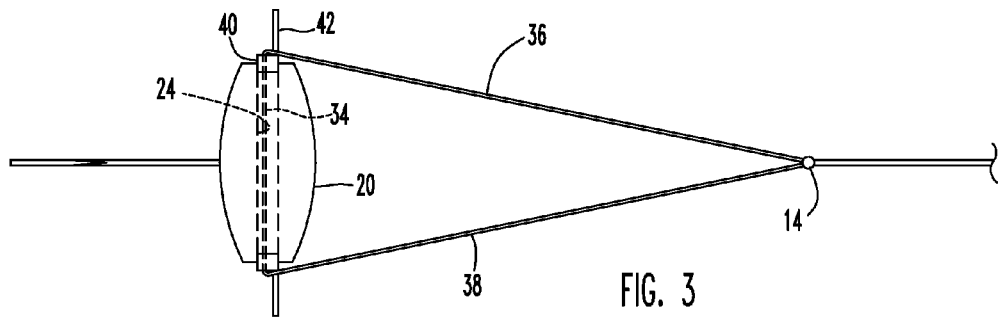
FIG. 3 is top view of the jig and snag guard assembly shown in FIG. 1.

The anti-rotation element 42 is formed from a length of relatively stiff fishing line or suitable equivalent. The filament 42 extends essentially parallel to the attachment member and extends outwardly from both sides of the jig head 20 beyond the guard filaments 36, 38 as best seen in FIG. 3.

Figure 2:
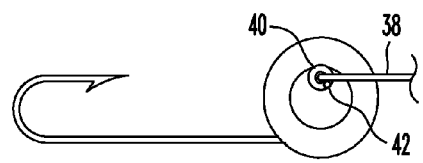
FIG. 2 is an enlarged side view of a portion of FIG. 1.

The jig 16 is free to rotate relative to the attachment member 34 in a clockwise direction as viewed in FIG. 2 from a first position shown in FIG. 2 to a second position where the side 30 of the fishhook 22 is adjacent the snag guard assembly 18.

When the snag guard assembly 18 is in its first position shown in FIG. 2, the anti-rotation element 42 is in the path of rotation of the guard filaments 36, 38 to resist counter-clockwise rotation of the jig 16 about the attachment member 34.

During normal retrieve of the jig 16, the snag guard assembly 18 is positioned about as shown in FIG. 1 with the fishhook upright. The jig 16 has limited ability to freely pivot or rotate about the attachment member 34 when encountering an obstacle during the retrieve to resist snagging.

When the jig 16 hits the water when cast, the resistance to rotation provided by the anti-rotation filament 42 interfering with the guard filaments 36, 38 greatly helps in reducing the number of retrieves with a downwardly facing fishhook.

FIG. 5 illustrates an alternative sleeve 50 that can be used in the snag guard assembly 18 instead of the separate sleeve and filament 42 members. The sleeve 50 is similar to the sleeve 40 but is the length of the filament 42. The opposite ends of the sleeve 50 are cut away to form filament members 52, 54 extending away from remainder of the sleeve 50. The filament members 52, 54 react with the guard filaments 36, 38 in the same manner as the filament 42 to resist pivotal rotation of the snag guard assembly 18 as previously described.

FIGS. 6 and 7 illustrate a portion of a second embodiment snag guard assembly 110. The snag guard assembly 110 replaces the anti-rotation filament 42 or sleeve filaments 52, 54 with a different structure to limit relative rotation of the jig.

The snag guard assembly 110 includes an attachment member 112 and guard filaments 114, 116 formed from a length of fishing line and tied to a connector 118. The attachment member 112 passes through a U-shaped anti-rotation member 120. The member 120 may be made from lead or steel and is tightly squeezed or crimped onto the attachment member 112 to attach the member 120 to the attachment member 112 and prevent relative motion between them.

Figure 8:
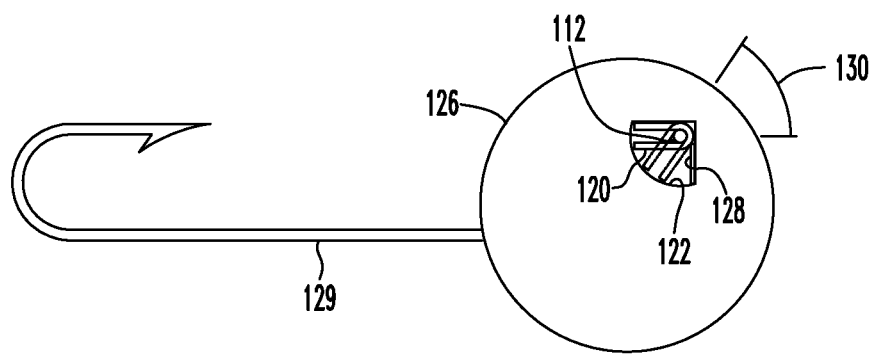
FIG. 8 is a side view of a jig and the second embodiment snag guard assembly attached to the jig.

FIG. 8 illustrates the attachment member 112 and the anti-rotation member 120 located within a through-bore 122 formed in the jig head of a round-head jig 126. The through-bore 122 has a non-circular cross-section that is shaped like a quarter-quadrant. The snag guard assembly 110 includes a support member 128 glued in the bore 122. The support member 128 maintains an end of the anti-rotation member 120 crimped to the attachment member 112 near the 90-degree corner of the bore 122. The wall of the bore 122 and the anti-rotation member 120 cooperate to limit the relative rotation of the jig 126 with respect to the anti-rotation member 120 to an angular displacement 130 preferably no more than 90 degrees.

As shown in FIG. 8, the jig 126 can rotate with respect to the anti-rotation member 120 from a first position in which the legs of the anti-rotation member 120 are essentially parallel with the hook shank 129 to a second position (with the anti-rotation member 120 shown in phantom in FIG. 8) where the legs of the anti-rotation member 120 are transverse to the shank 129.

During normal retrieve of the jig 126, the snag guard assembly 110 is being pulled such that the legs of the anti-rotation member 112 are essentially parallel with the hook shank as shown in FIG. 8.

FIG. 9 illustrates an anti-rotation member 130 that is an alternative to the anti-rotation member 122. The illustrated anti-rotation member 130 is a commercially available lead, copper, or steel crimping sleeve that is intended for crimping on fishing line. The attachment member 112 can be centered in the sleeve 130 prior to crimping.

Figure 10:
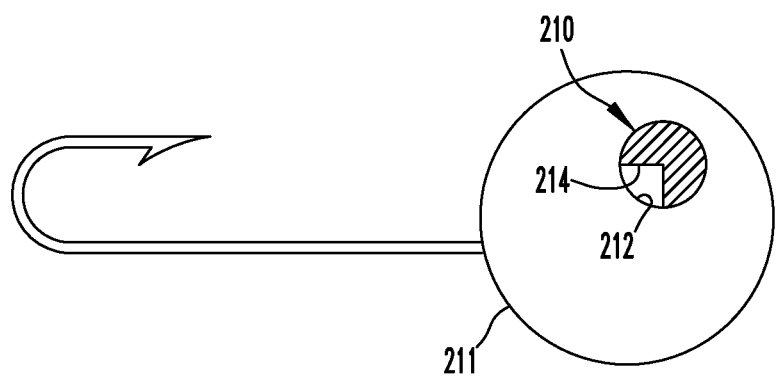
FIG. 10 is a side view of a jig and a portion of a third embodiment snag guard assembly.

FIG. 10 illustrates a portion of a third embodiment snag guard assembly 210. This embodiment allows use of a snag guard assembly having an anti-rotation member 120, 130 with conventional jigs having a circular through-bore. A round-head jig 211 has a through-bore 212 having a circular cross-section. The snag guard assembly includes a filler member 214 that is received in the bore 212 and cooperates with the jig 210 in defining a passage having a non-round cross section. In the illustrated embodiment the non-round cross section is similar in shape to that of the bore 122 shown in FIG. 8. The snag guard assembly includes an anti-rotation member (not shown) similar to the anti-rotation member 120, 130 that is received in the non-round passage and cooperates with a support member (not shown) like the support member 128 that is placed in the bore passage to limit relative rotation of the jig about the attachment member as previously described.

FIGS. 11 and 12 illustrate a fourth embodiment snag guard assembly 310. The snag guard assembly 310 is shown used with a jig 312. The jig 312 has a jig body 314 having a circular through bore 316.

The snag guard assembly 310 includes a curved or arcuate tube 318 that is a permanently curved member. The tube 318 can be formed, as a nonlimiting example, by heat setting non-metal tubing used for holding spinner blades to fishhooks or wire shafts of fishing lures. The tube 318 is positioned in the bore 316 with the convex side of the tube facing away from the jig fishhook 320 and inclined at an angle 332 from the line 323 defined by the fishhook shank towards the fishhook barb 324. Preferably the angle 332 is greater than about 30 degrees and is less than 90 degrees, and is preferably about 45 degrees.

Rotation of the tube 318 within the bore 316 is resisted by the curvature of the tube 318. However, the tube 318 can also be glued or otherwise fixed to the wall of the bore 316.

The snag guard assembly 310 further includes an attachment member 326 that extends through the tube 318, and first and second guard filaments 328, 330, the member and filaments formed from a single length of fishing line. The attachment member 326 preferably fits tightly in the tube 318 to resist relative motion of the attachment member 326 and tube 318, or the attachment member 326 can be glued or otherwise fixedly attached to the tube 318. In this way the attachment member 326 effectively fixes the ends of the guard filaments 328, 330 adjacent the jig body 314 with respect to the jig body 314.

The fishing line forming the member 326 and the guard filaments 328, 330 is preferably a nylon or fluorocarbon monofilament fishing line (fluocarbon fishing line being made by combining a carbon base [polyvinylidene fluoride] and other materials to form a line that is almost invisible underwater since its refractive index is the same as water) having sufficient stiffness to be self-supporting to extend from the jig body 314 as shown in FIG. 11. The inherent stiffness of the fishing line and the tube 318 cooperate in resisting angular deflection of the guard filaments 328, 330, thereby biasing the guard filaments 328, 330 to the angular position relative to the fishhook shown in FIG. 11. Yet the guard filaments 328, 330 have sufficient flex to enable the jig body 314 and the fishhook 320 are properly oriented when the fishing line pulls the snag guard assembly 310 during retrieve. Any dressing applied to the jig generates drag that further assists in aligning the jig body during retrieve.

The illustrated tube 318 is shown extending from the ends of the jig bore 314. In other embodiments the tube 318 can be substantially flush with the ends of the jig bore 314. If necessary, the jig head can be tapered or otherwise modified to not interfere with or substantially contact the guard filaments 328, 330.

The snag guard assemblies 10, 110, 210, 310 described above each resist relative rotation of the snag guard assembly with respect to the jig head towards one side of the fishhook. It is believed that when the jig hits the water after a cast, the resistance assists in preventing a downward facing fishhook during retrieve of the jig. Although the guard assembly 310 is a non-rotatable guard assembly, the guard filaments 328, 330 do have some inherent flexibility to enable limited pivoting or rotation of the jig body about the attachment member 326 when the jig body encounters an obstacle during the retrieve.

The illustrated guard filaments are formed from monofilament fishing line. In other embodiments the guard filaments can be formed from wire.

While one or more embodiments have been described in detail, it is understood that this is capable of modification and that the disclosure is not limited to the precise details set forth but includes such changes and alterations as fall within the purview of the following claims.

What is claimed is:

1. A combination jig and snag guard assembly comprising:
   a jig and a snag guard assembly;
   the jig comprising a body having a back and opposite sides and a fishhook fixedly attached to and extending from the back of the body;
   the snag guard assembly attached to the jig body and comprising a pair of guard filaments, a through bore extending through the jig body, an attachment member in the bore extending through the jig body, and a stop member;
   the guard filaments extending from the opposite sides of the jig body to a connector configured to be tied to a fishing line, each guard filament having an end adjacent the respective side of the jig body, the attachment member being connected to the ends of the guard filaments;
   the jig body movable with respect to the attachment member through a range of angular motion about a first axis defined by the ends of the guard filaments;
   the stop member being fastened to one of the jig body and the attachment member for conjoint motion with the said one of the jig body and the attachment member; and
   the stop member being disposed to generate a force transmitted to the jig body resisting relative rotation of the jig body with respect to the attachment member before the jig body reaches an end of the range of angular motion and thereby resist further relative motion of the jig body with respect to the attachment member towards the end of the range of motion.

2. The combination jig and snag guard assembly of claim 1 wherein the stop member is fastened to the attachment member and is rotatable in the bore with respect to the jig body between a first position and a second position not more than 180 degrees from the first position, the jig body obstructing further movement of the stop member beyond the first and second positions.

3. The combination jig and snag guard assembly of claim 2 wherein the bore has a non-circular cross section.

4. The combination jig and snag guard assembly of claim 2 wherein the bore is defined by an annular wall having a circular cross section and the snag guard assembly includes a filler piece in the bore and partially filling the bore and cooperating with the wall to define a non-circular bore extending through the jig body.

5. The combination jig and snag guard assembly of claim 2 wherein the snag guard assembly includes a support member in the bore that is not integral with the jig body, the stop member pivotally supported against the support member.

6. The combination jig and snag guard assembly of claim 2 wherein the guard filaments and attachment member are formed from a single length of nylon monofilament or fluorocarbon monofilament.

7. The combination jig and snag guard assembly of claim 1 wherein the ends of the guard filaments are fixed with respect the jig body.

8. The combination jig and snag guard assembly of claim 7 wherein the fishhook comprises a shank extending along a second axis and the guard filaments when unstressed extend along a third axis inclined from the second axis at an angle of between 30 degrees and 90 degrees inclusive.

9. The combination jig and snag guard assembly of claim 7 wherein the stop member is a curved tube disposed in the bore, the attachment member extending through the tube, the curvature of the tube resisting displacement of the tube within the bore relative to the jig body.

10. The combination jig and snag guard assembly of claim 9 wherein the guard filaments and the attachment member are formed from an integral length of nylon monofilament or fluorocarbon monofilament.

11. The combination jig and snag guard assembly of claim 1 wherein the stop member is fastened to the jig body and extends away from the jig body from one of the sides of the jig body, the stop member being disposed to impact at least one of the guard filaments before the jig body reaches the first end of the range of motion.

12. The combination jig and snag guard assembly of claim 11 wherein the stop member is a first end portion of an elongate member extending through the bore.

13. The combination jig and snag guard assembly of claim 12 wherein the snag guard assembly includes a second stop member, the second stop member being a second end portion of the elongate member.

14. The combination jig and snag guard assembly of claim 12 wherein the elongate member is disposed on a side of the attachment member.

15. The combination jig and snag guard assembly of claim 12 wherein the elongate member comprises a tubular portion, the attachment member extending through the tubular portion.

16. The combination jig and snag guard assembly of claim 12 wherein the guard filaments and the attachment member are formed from an integral one-piece length of nylon monofilament or fluorocarbon monofilament.

17. The combination jig and snag guard assembly of claim 2 wherein the stop member is crimped to the attachment member.

18. The combination jig and snag guard assembly of claim 9 wherein the tube has a convex side and a convex side, the convex side facing away from the fishhook.

19. The combination jig and snag guard assembly of claim 18 wherein the fishhook comprises a shank extending along a second axis and the convex side of the tube lies in a plane that is inclined at an angle of not less than about 30 degrees and not more than about 90 degrees from the second axis.

20. The combination jig and snag guard assembly of claim 11 wherein the bore is surrounded by an annular wall and the snag guard assembly includes a sleeve in the bore, the sleeve being in frictional engagement with the wall whereby the sleeve is fastened to the jig body, the attachment member extending through the sleeve, the stop member being a filament disposed between the sleeve and the wall, the filament being in frictional engagement with the wall whereby the filament is fastened to the jig body, the filament extending out of the bore.

21. A combination jig and snag guard assembly comprising:
   a jig and a snag guard assembly;
   the jig comprising a body having a back and opposite sides and a fishhook extending from the back of the jig body;
   the snag guard assembly being attached to the jig body and comprising a pair of guard filaments, a through bore extending through the jig body, an attachment member in the bore extending through the jig body, and a curved tube in the bore, the tube comprising opposite ends;
   the guard filaments extending from the opposite sides of the jig body to a connector configured to be tied to a fishing line, each guard filament having an end adjacent a respective end of the tube, the attachment member extending through the tube and connecting the ends of the guard filaments, the curvature of the tube resisting displacement of the tube within the bore relative to the jig body; and the fishhook comprising a shank extending along an axis, the curvature of the tube in a plane inclined with respect to the second axis.

22. The combination jig and snag guard assembly of claim 21 wherein the guard filaments and the attachment member are formed from an integral length of nylon monofilament or fluorocarbon monofilament.

23. The combination jig and snag guard assembly of claim 21 wherein the tube has a convex side and a convex side, the convex side facing away from the fishhook.

24. The combination jig and snag guard assembly of claim 23 wherein the convex side of the tube is inclined at an angle of not less than about 30 degrees and not more than about 90 degrees from the axis.

25. The combination jig and snag guard assembly of claim 21 wherein the attachment member fits tightly in the tube and resists relative motion of the attachment member and tube.

26. The combination jig and snag guard assembly of claim 21 wherein the tube is fastened to the jig body by an adhesive.

* * * * *